Figure 1:
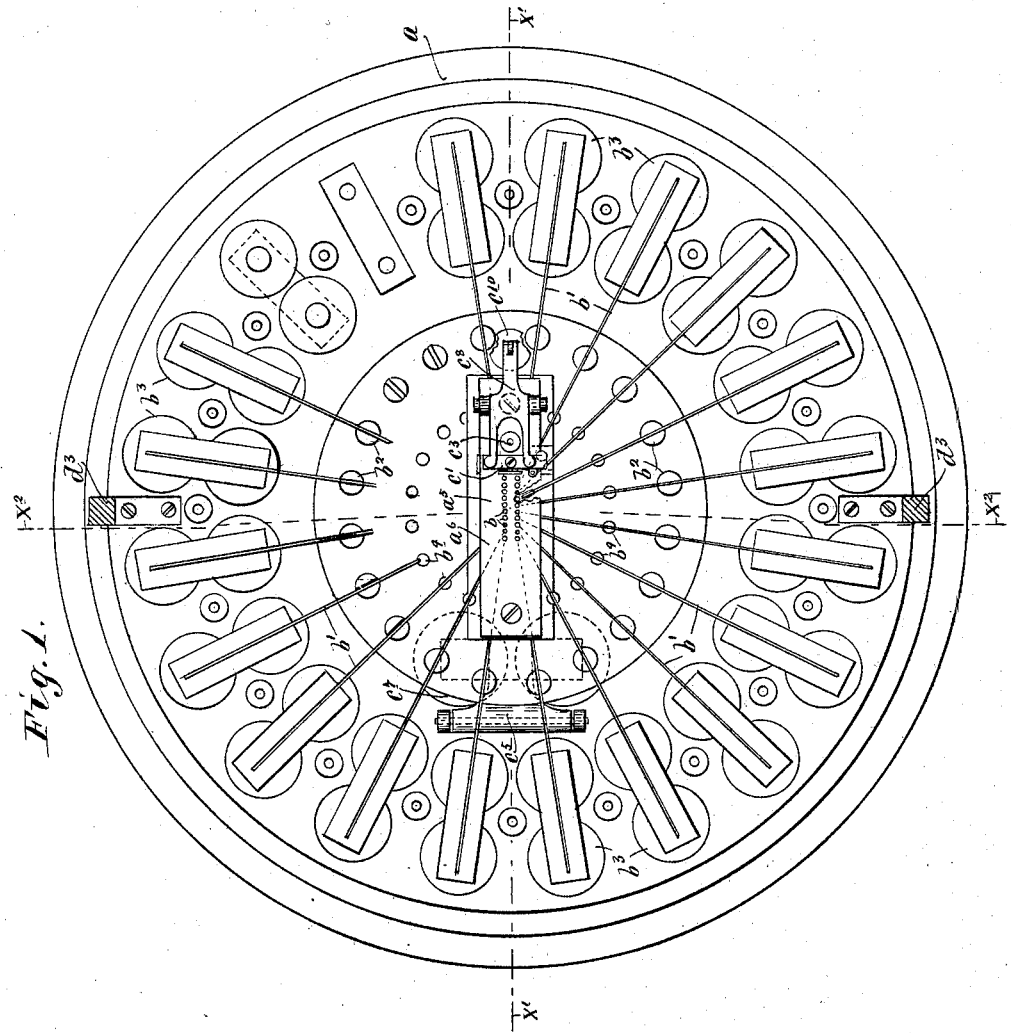

No. 609,097.  
Patented Aug. 16, 1898.

G. A. GOODSON.
COMPOSING MACHINE.
(Application filed Dec. 8, 1893.)

(No Model.)  
6 Sheets—Sheet 1.

Witnesses:  
A. H. Opsahl.  
Frank D. Merchant.

Inventor.  
George A. Goodson  
By his Attorney.  
Jas. F. Williamson

THE NORRIS PETERS CO., PHOTO-LITHO., WASHINGTON, D. C.

No. 609,097. Patented Aug. 16, 1898.
G. A. GOODSON.
COMPOSING MACHINE.
(Application filed Dec. 8, 1893.)

(No Model.) 6 Sheets—Sheet 2.

Witnesses.
A. H. Opsahl.
Frank D. Merchant.

Inventor.
George A. Goodson
By his Attorney.
Jas. F. Williamson

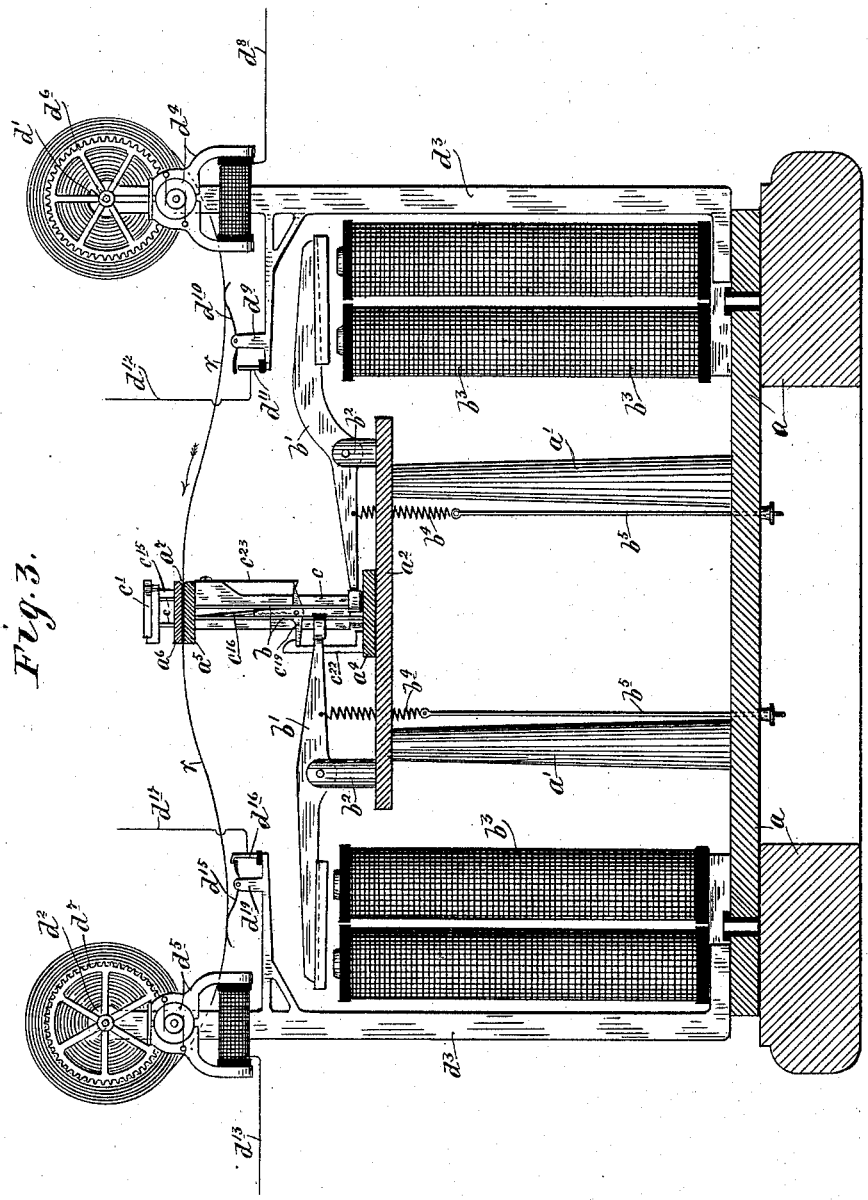

No. 609,097. Patented Aug. 16, 1898.
G. A. GOODSON.
COMPOSING MACHINE.
(Application filed Dec. 8, 1893.)
(No Model.) 6 Sheets—Sheet 4.
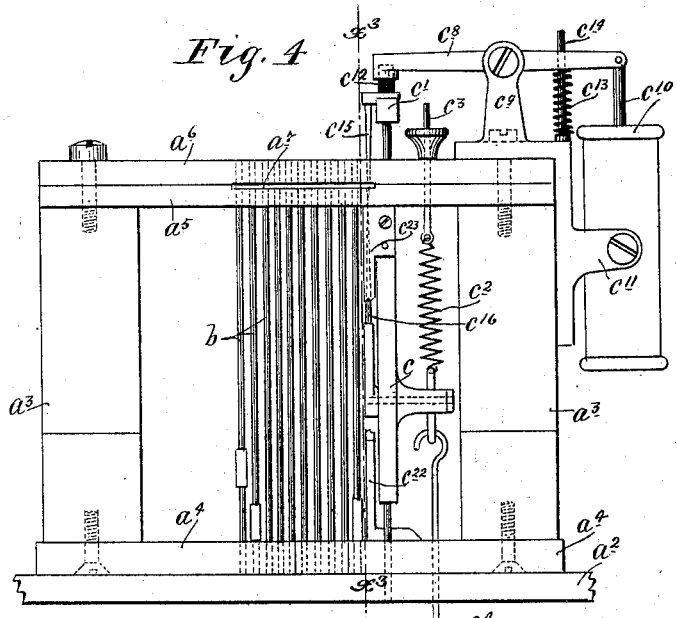
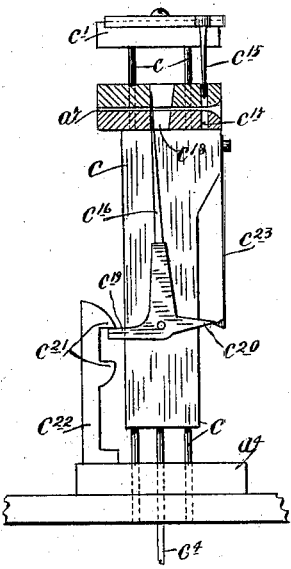
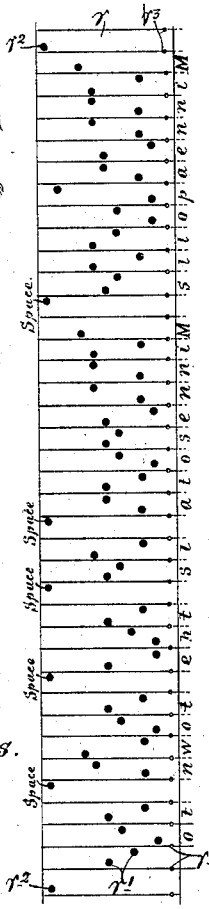
Witnesses.
A. H. Opsahl.
Frank D. Merchant.
Inventor.
George A. Goodson
By his Attorney.
Jas. F. Williamson
THE NORRIS PETERS CO., PHOTO-LITHO., WASHINGTON, D. C.

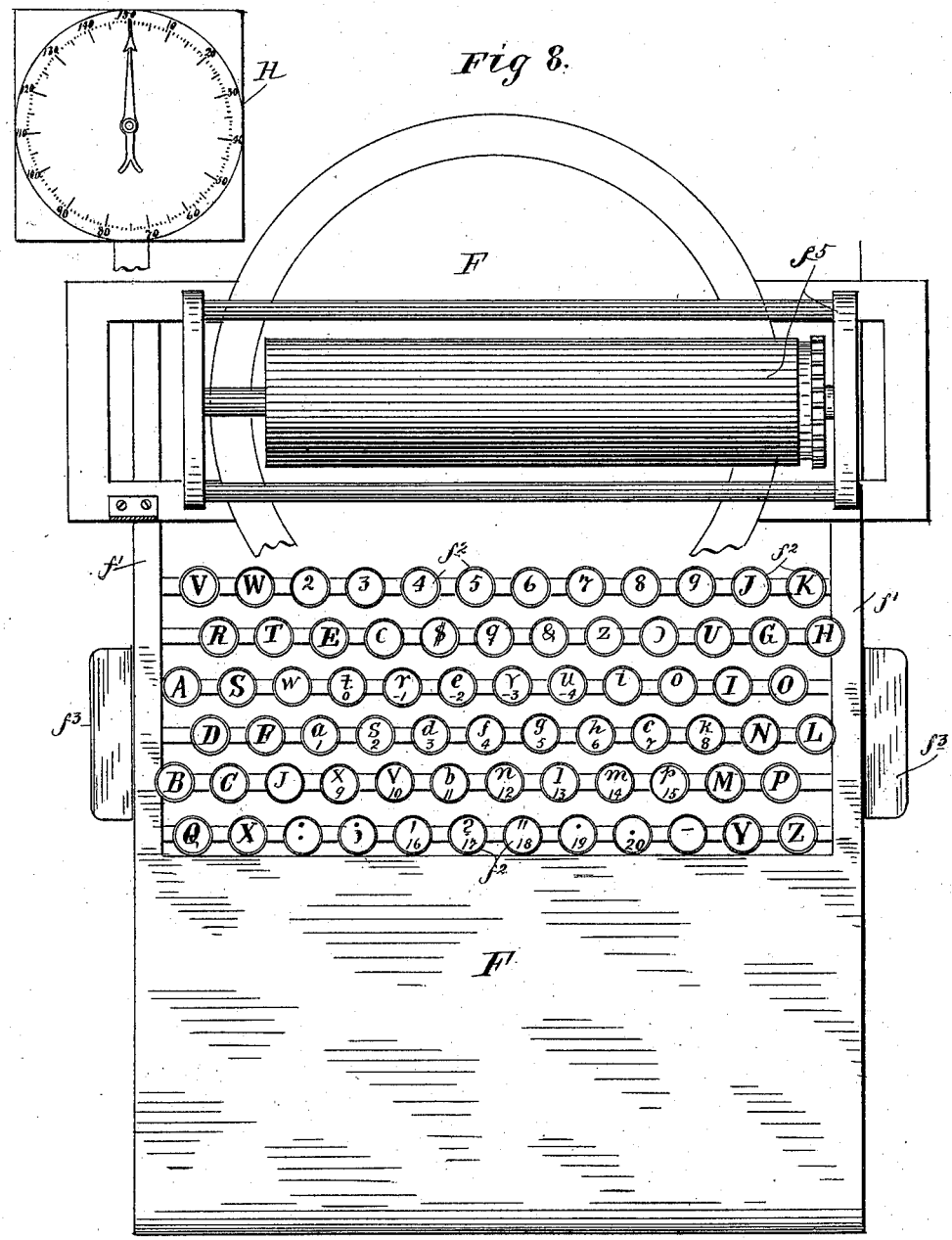

No. 609,097.  Patented Aug. 16, 1898.
G. A. GOODSON.
COMPOSING MACHINE.
(Application filed Dec. 8, 1893.)
(No Model.)  6 Sheets—Sheet 6.

Witnesses.
A. H. Opsahl.
Frank D. Merchant.

Inventor.
George A. Goodson
By his Attorney.
Jas. F. Williamson

United States Patent Office.

GEORGE A. GOODSON, OF MINNEAPOLIS, MINNESOTA, ASSIGNOR TO THE GOODSON TYPE CASTING AND SETTING MACHINE COMPANY, OF SAME PLACE.

COMPOSING-MACHINE.

SPECIFICATION forming part of Letters Patent No. 609,097, dated August 16, 1898.

Application filed December 8, 1893. Serial No. 493,115. (No model.) Patented in France December 4, 1894, No. 243,372; in England December 5, 1894, No. 23,684; in Canada May 7, 1896, No. 52,195, and in Germany August 22, 1896, No. 88,406.

*To all whom it may concern:*

Be it known that I, GEORGE A. GOODSON, a citizen of the Dominion of Canada, residing at Minneapolis, in the county of Hennepin and State of Minnesota, have invented certain new and useful Improvements in Composing-Machines for Type Casting and Setting Machines; and I do hereby declare the following to be a full, clear, and exact description of the invention, such as will enable others skilled in the art to which it appertains to make and use the same.

The mechanism herein disclosed was patented in Germany in Patent No. 88,406, of date August 22, 1896; in Great Britain in Patent No. 23,684, of date December 5, 1894; in France in Patent No. 243,372, of date December 4, 1894, and in Canada in Patent No. 52,195, of date May 7, 1896. The applications for all of these foreign patents were filed subsequent to the filing of this United States application.

My invention has for its object to provide an efficient composing-machine for the simultaneous production of a punctured representative strip and a type-written proof of the composition.

This composing-machine is one of a pair of machines which I employ in my system for producing justified lines of individual type. The other member of said pair of machines is a combined type-casting and type-setting machine, which is fully described in a United States Patent granted to me of date December 4, 1894, No. 530,481, and entitled "Type casting and setting machine," and which operates under the control of the punctured representative strip, which is produced by the composing-machine herein described.

The composing-machine involves the coöperation of a type-writing machine and a puncturing mechanism or perforator.

This composing-machine will be hereinafter fully described, and the novel features of the same will be defined in the claims.

The accompanying drawings illustrate the machine, wherein like letters refer to like parts.

Figure 2:
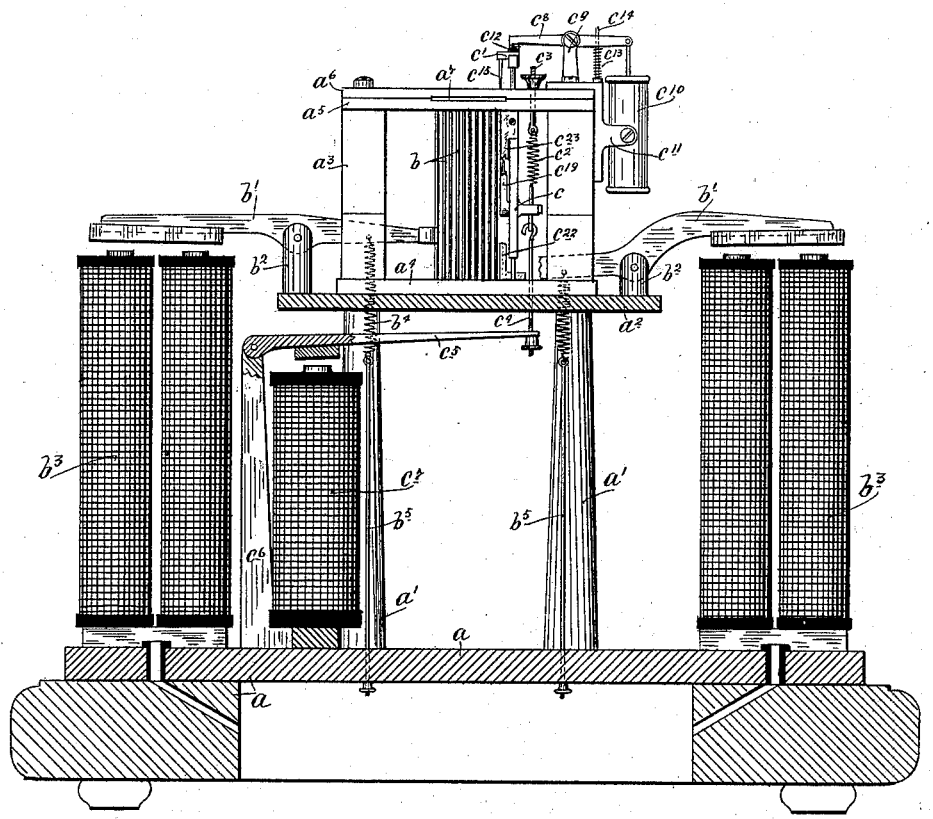
Figure 10:
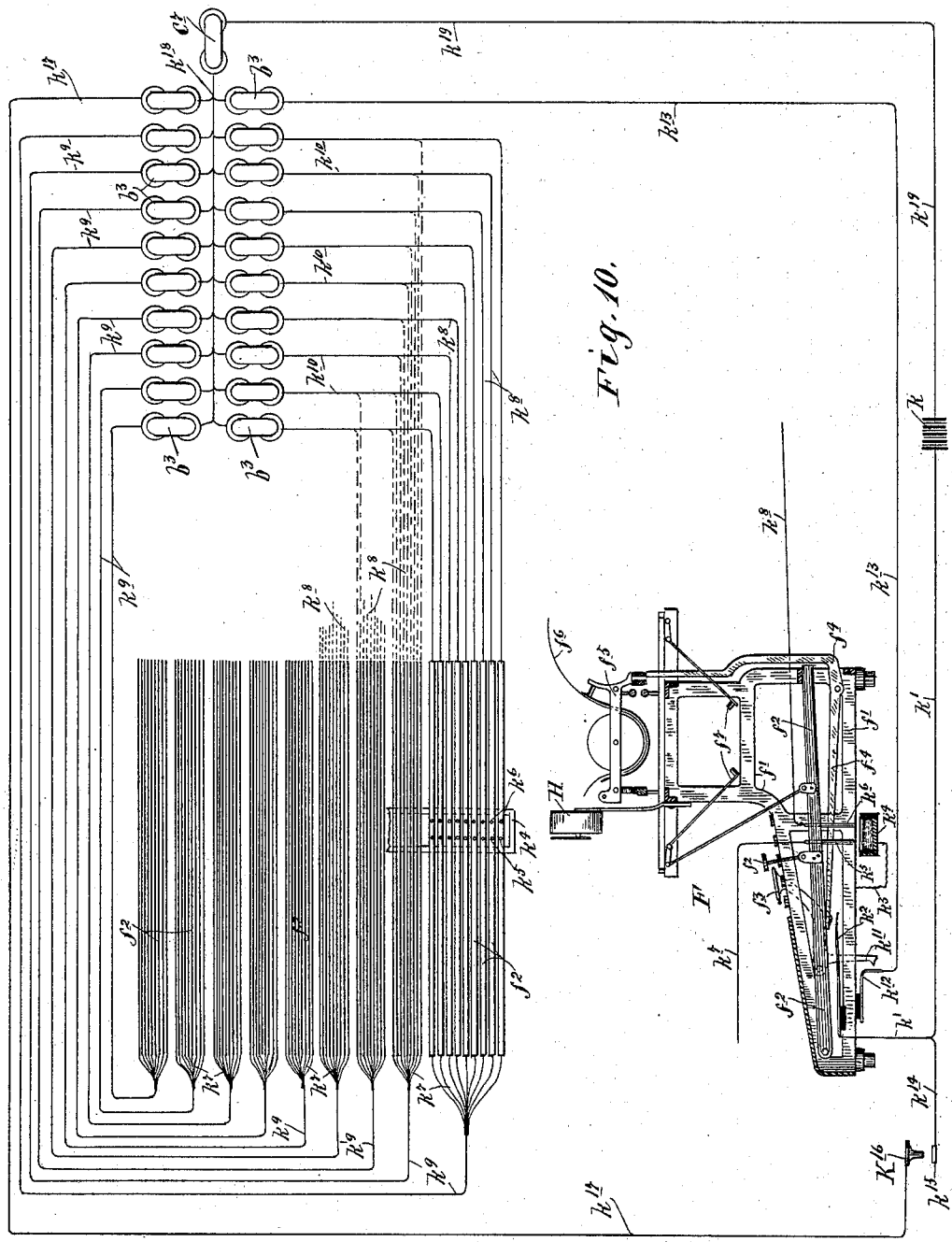

Figure 1 is a plan view of the perforator with some parts broken away. Fig. 2 is a vertical section of the same on the line $X'$ $X'$ of Fig. 1 with some parts removed. Fig. 3 is a vertical section of the same on the line $X^2$ $X^2$ of Fig. 1 with some parts removed. Fig. 4 is a front elevation of the punch-frame and the strip-feeding mechanism detached. Fig. 5 is a vertical section on the line $X^3$ $X^3$ of Fig. 4, looking from the left, showing the feed-needles in one of their extreme positions. Fig. 6 is a similar view on the same line, showing the feed-needles in their opposite extreme positions. Fig. 7 is a plan view of the representative controlling strip or product of the machine full size. Fig. 8 is a plan view of an ordinary type-writing machine shown as of the Caligraph variety, having certain changes made therein for adapting the same to be connected up for operating the perforator. Fig. 9 is an outline view of the differential register, detached, with which the type-writer is equipped; and Fig. 10 is a diagram view illustrating the electrical connections from the type-writer to the magnets of the perforator, with the type-writer shown in sectional elevation from front to rear.

*Perforator.*—All the parts of the perforator are supported from a suitable base $a$, (shown as of circular form,) and which is preferably made of wood for convenience of insulation. To standards $a'$, rising from the base-plate $a$, is secured a central shelf $a^2$. On the said shelf $a^2$ is mounted a punch-frame, consisting of uprights $a^3$, lower guide-block $a^4$, and sectional upper guide-block $a^5$ $a^6$, having parts of the joint-surfaces cut away to form a guide-slot $a^7$ for the strip to be punctured. In the said punch-frame are mounted two sets or series of ten punches $b$, the sets of which are arranged parallel with each other lengthwise of the guide-block $a^5$ $a^6$ and working through the strip-slot $a^7$. The punches $b$ are carried on the inner ends of armature-levers $b'$, which are pivoted to bearing-lugs $b^2$, rising from the shelf $a^2$. The armature-levers $b'$ are subject on one side of their fulcrums to a corresponding series of electromagnets $b^3$, supported from the base-piece $a$, and on the other side of their fulcrums to a corresponding series of springs $b^4$, connected, as shown, by rods $b^5$ with the base-piece $a$.

Between the upper and lower guide-blocks of the punch-frame at one end of the two series of punches is located a thrust-bar $c$, having projecting parts at its lower end working in the lower guide-block and having projecting parts at its upper end working through the upper guide-block and connected at their upper ends by a head-piece $c'$. A single reference-letter is applied to the body and projecting parts of said thrust-bar for the sake of greater distinctness on the drawings. The thrust-bar $c$ is normally held in its uppermost position by a spring $c^2$, adjustably secured to the top guide-block and the punch-frame by draw-bolt $c^3$, and is connected by an adjustable draw-rod $c^4$ with the free end of an armature-lever $c^5$, pivoted to bearing-post $c^6$, and subject to the action of electromagnet $c^7$, resting on the base-piece $a$. The magnet $c^7$ coöperates with the spring $c^2$ to impart a reciprocating movement at the proper time to the feed-needle thrust-bar $c$, and may be therefore called the "feed-magnet" to distinguish the same from the punch-magnets $b^3$. The electric connections for the said magnets $b^3$ and $c^7$ will appear later on.

The head-piece $c'$ of the thrust-bar $c$ is subject to the inner end of a lever $c^8$, pivoted to bearing-lug $c^9$, fixed to the punch-frame and having its outer end connected to the piston member of a dash-pot $c^{10}$, the cylinder member of which dash-pot is pivoted to bearing-lug $c^{11}$ of the punch-frame. The inner end of the dash-pot lever $c^8$ has a rubber bearing surface or buffer $c^{12}$ for operation on the thrust-bar head $c'$. The piston member of the dash-pot $c^{10}$ is given its outstroke by a spring $c^{13}$, encircling guide-rod $c^{14}$, rising from the punch-frame, with its free end projecting through the outer arm of the lever $c^8$. The purpose of this dash-pot device is to retard the upstroke of the thrust-bar $c$ under the action of its retracting-spring $c^2$.

The thrust-bar $c$ carries a pair of feed-needles $c^{15}$ $c^{16}$, of which parts the needle $c^{15}$ is fixed to the head-piece $c'$ of the thrust-bar and works from above into a suitable puncturing-hole $c^{17}$ of the top guide-block of the punch-frame, and the other needle $c^{16}$ is pivoted to the body of the thrust-bar below the top guide-block of the punch-frame, with its free end working from below in a limiting-slot $c^{18}$ of said guide-block. The pivoted needle $c^{16}$ has laterally-projecting arms $c^{19}$ $c^{20}$, of which the arm $c^{19}$ is subject, under the movements of the thrust-bar, to a pair of cam-lugs $c^{21}$ on bracket-post $c^{22}$, rising from the punch-frame, and the arm $c^{20}$ is subject to the action of a spring-catch $c^{23}$, carried on the thrust-bar, by which the pivoted needle is held at the opposite extremes of its pivotal motion.

The strip of paper $r$ in its blank form is unwound from a supporting-spool $d'$ and is wound up, after being punctured, onto a spool $d^2$. These spools $d'$ $d^2$ are carried on the upper ends of bearing-brackets $d^3$, rising from the base-piece $a$, and are operated by small electric motors $d^4$ $d^5$, also supported by said bearing-brackets $d^3$, the armature members of which have pinions (not shown) engaging gears $d^6$ $d^7$, respectively, cut on the said spools $d'$ $d^2$. The said electric motors are automatically controlled, so as to permit the punches $b$ and the feed-needles $c^{15}$ $c^{16}$ always to operate on a slack section of the strip. The motor $d^4$ is supplied with current from source-wire $d^8$, whence the current passes through bracket $d^3$ to a bearing-lug $d^9$, having a pivoted contact $d^{10}$, tending to make contact with an insulated post $d^{11}$, which has a return-wire $d^{12}$ leading to source. In a similar way the motor $d^5$ is supplied by source-wire $d^{13}$, whence the current passes through bracket $d^3$ to post $d^{14}$, having pivoted contact $d^{15}$, tending to break connection with an insulated post $d^{16}$, which has a return-wire $d^{17}$ leading to source. The motor $d^4$ will unwind the strip from the spool $d'$ until there is sufficient slack in the strip to drop onto the free end of the pivoted contact $d^{10}$, when the circuit will be opened between $d^{10}$ and $d^{11}$ and the motor $d^4$ will stop. Whenever the slack is taken up, the motor $d^4$ will be again started by the pivoted contact $d^{10}$ resuming its normal position in contact with the post $d^{11}$. The motor $d^4$ and the parts just noted will therefore always maintain slack between the unwinding-spool and the punch-frame. In a similar way the motor $d^5$ is normally idle, with the circuit open between the parts $d^{15}$ and $d^{16}$; but whenever the strip gains sufficient slack to drop onto the pivoted contact $d^{15}$ the circuit will be closed between $d^{15}$ and $d^{16}$ and the motor be thrown into action long enough to take up the excess of slack. In this way the strip itself is made to control the motors $d^4$ $d^5$, so as to always maintain a slack section in the strip at the part of the same being operated upon by the punches $b$ and the feed-needles $c^{15}$ $c^{16}$. The purpose of maintaining this slack section is to avoid any undue strain on the strip by the feed-needles $c^{15}$ $c^{16}$, so as to insure an exact feed and preserve the integrity of the feed-holes made in the said strip.

By inspection of Figs. 5 and 6 of the drawings it will be seen that the feed-needles $c^{15}$ $c^{16}$ are so related that they will engage with the strip in alternate order from opposite sides of the same and that the engagement of the one needle always takes place when the strip is held stationary by the other. The strip is therefore always positively held by one or the other of said needles, and at the initial action on the strip of the punches $b$ is engaged and held stationary by both needles. On the downstroke of the thrust-bar $c$ the fixed needle $c^{15}$ operates to make on the margin of the strip one of the feed-holes $r^3$, and at the limit of the thrust-bar's downward stroke the arms $c^{19}$ of the pivoted needle $c^{16}$ will be engaged by the lower member of the cam-lugs $c^{21}$ and the needle will thereby be thrown into the position shown in Fig. 6, where it will be held by the spring-latch $c^{23}$ engaging with the top surface of the needle-arm $c^{20}$. On the upstroke of the thrust-bar $c$ the pivoted needle $c^{16}$ will engage with the feed-hole $r^3$ last previously made, and at the limit of the thrust-bar's upward stroke the needle-arm $c^{19}$ will be engaged by the upper member of the cam-lug $c^{21}$, and the pivoted needle $c^{16}$ will thereby be thrown forward into the position shown in Fig. 5, where it will be held by the spring-latch $c^{23}$ engaging with the under surface of the arm $c^{20}$. By this movement of the pivoted needle $c^{16}$ the strip $r$ will be fed forward one step, determined by the limiting-slot $c^{18}$. The relation and action of these feed-needles $c^{15}$ $c^{16}$ therefore afford a most positive and accurate feed to the strip, and in virtue of their operation on a slack section of the strip, as hitherto noted, no material strain will occur on the feed-needles lengthwise of the strip, and hence the strip will be fed forward without slip or tear from the feed-needles and the integrity of the feed-holes $r^3$ will be preserved.

Of course it will be understood that the feed-needles might be reversely arranged and that one or both of the said needles might be in the form of punches instead of needles. The further relations and actions of the parts of the perforator or puncturing mechanism will appear later on, after describing the type-writer and the electrical connections therefrom.

*The type-writer and indicator* (see Figs. 8, 9, and 10).—Any suitable type-writing machine which is equipped with a differential letter-space indicator graduated in multiples of the common unit used for measuring the corresponding type-face may be adapted by slight changes for my purposes. I preferably employ, however, a type-writing machine which has a separate key for every character, on account of the greater convenience thereby afforded for making the electric connections. I have shown a type-writing machine of the variety known as the "Caligraph," which is very readily adapted for my work. This type-writing machine is shown in vertical section in Fig. 10 of the drawings and marked F. The details or parts of the type-writing machine only require notice in so far as necessary to locate the electric connections. For this purpose it is sufficient to distinguish the frame $f'$, character-keys $f^2$, space-keys $f^3$, the feed-bail or rocker $f^4$, the carriage $f^5$, and the paper $f^6$, on which the print is made by the type-levers $f^7$.

The type-writer F is equipped with a differential register H, which is graduated in multiples of the common unit used for measuring self-spacing type. Otherwise the indicator may be of any suitable construction adapted to be operated directly or indirectly from the keys. As these indicators or registers are well-known in the art as applied to type-writers, it is not deemed necessary for the purposes of this case to show and describe the detail construction of the indicator employed. It will be sufficient to state that the construction of the same may be identical with that shown in my former patent, No. 427,680, of date May 13, 1890, wherein the indicating mechanism is operated electrically by suitable connections from the keys of the type-writer. It must also be noted that certain of the keys, in addition to the ordinary characters for type-writing purposes, are also marked with numbers (in small print) ranging from "1" to "20" and from "0" to "4," which numbers are for the purposes of justification. The numbers referred to, from "1" to "20," indicate the range or possible amounts of space above normal expressed in units which may be distributed or indicated for distribution by way of addition. The zero-mark indicates the normal spacing of two units, and the negative numbers "1," "2," "3," "4," represent possible amounts of space which may be distributed by way of subtraction from normal or hair spacing.

Otherwise stated, the type casting and setting machine is constructed to distribute from one to twenty units by way of addition to the normal word-spacing of two units, or to distribute from one to four units by way of subtraction or hair-spacing of from one to four word-spaces, and hence this type-writer has certain of its keys correspondingly marked in order to indicate the justification on the representative strip. These particular keys thus marked therefore serve a double function.

The above-noted positive justification-numbers ("1" to "20") may be called "extras," and the negative numbers ("1" to "4") may be called "intras."

*Electrical connections*, (see Fig. 10.)—These connections will be more readily understood by first calling attention to the relation of the two series of punches $b$ to the type-casting and type-setting machine described in my Patent No. 530,481, hereinbefore referred to. In the said type-casting and type-setting machine a complete font of matrices is formed integral with a common plate, which, taken together with certain other parts for strengthening and centering purposes, &c., constitutes what is therein called the "matrix-block," and the matrices thereon are arranged on a bifactored principle into rows in two directions for the selection of any matrix by two corresponding movements of the matrix-block in different directions. To effect this selection, the matrix-block is interceptible in these two movements by two corresponding series or sets of stops. On the matrix-block are ten rows of ten positions each. Hence there are ten row-selecting movements in one direction and ten steps of movement in the other direction for the individual positions of each row. As the extreme movement in either direction may be limited by stationary stops, only nine of each series or set of stops need to be movable and provided with operating-magnets. The ten rows of ten matrices each or ten positions each may be called the "font-factors." The type-casting and type-setting machine has two sets or series of ten thrust-pins, each corresponding to said font-factors; but as only nine movable stops and corresponding magnets are required in each of the two sets for intercepting the matrix-block only nine of each set of said thrust-pins are required as part of the electric connections for coöperation with the representative strip to control said stop-magnets. This leaves two of said twenty thrust-pins on the type-casting machine, one out of each set of ten, available for other purposes, one of which is employed to control a trip for a clutch device and the other to control the escapement member of a justifier at the word-spaces.

In the type-casting and type-setting machine the magnets which control the stops for positioning the matrix-block to select the row are called the "row-selecting" magnets, and the other coöperating nine magnets which position the block for the particular matrix or position of the row are called the "individual" magnets or "individual-stop" magnets.

Let it now be assumed that the rear series of the punches $b$, as shown in Fig. 1 of this case, correspond to the series of thrust-pins on the type casting and setting machine which coöperate with the strip to control the row-selecting magnets for positioning the matrix-block and that the front series of the punches $b$, as shown on Fig. 1 of this case, correspond to the series of thrust-pins on the type casting and setting machine which coöperate with the strip to control the individual-stop magnets for positioning the matrix-block. The rear series of the magnets $b^3$ on Fig. 10 will then correspond to the row-selecting set of the punches $b$, and the front series of said magnets $b^3$ on Fig. 10 will then correspond to the individual-selecting set of the punches $b$. As a matter of fact the above-assumed relations are the relations which actually exist between the said corresponding parts of the said two machines. All the thrust-pins on the type casting and setting machine and all the punches and punch-magnets on the composing-machine therefore have relation to and may be said to be determined by the possible positions required for the matrix-block of the type-casting and type-setting machine. In other words, the two series of ten thrust-pins on the casting-machine and the two series of ten punches on the composing-machine correspond to the front factors or ten rows of ten individual positions each for the matrix-block, and one member of each factor or set not being needed for positioning the block two thrust-pins and two corresponding punches become available for other purposes.

With the foregoing statements in mind the arrangement of the electrical connections become readily intelligible with respect to the work to be done.

From a suitable source of electricity (shown at $k$) extends wire $k'$ to an insulated spring-contact $k^2$ on the type-writer frame $f'$. This contact $k^2$ is in position to engage and make contact with the under surface of the metallic feed-bail $f^4$, whence the current may pass to the frame of the machine and by wire $k^3$ to a mercury-containing trough $k^4$, composed of insulating material and located under and crosswise of the type-writing machine. To each of the character-keys $f^2$ of the keyboard is fixed a pair of downwardly-projecting contact-studs $k^5$ $k^6$ of such length that they will enter the mercury in the trough $k^4$ before the circuit is closed between the feed-bail $f^4$ and the contact $k^2$ on the downstroke of a key $f^2$ and will remain in the mercury until after the circuit is open between the feed-bail $f^4$ and contact $k^2$ on the upstroke or return movement of the key. This avoids sparking at the trough and waste of the mercury thereby.

From the character-key contacts $k^5$ $k^6$ extend branch circuit-wires $k^7$ $k^8$. Of these all the wires $k^7$ for the character-keys of the entire keyboard are grouped into nine sets connecting by row group-wires $k^9$ with nine corresponding members of the row-selecting or rear series of punch-magnets $b^3$. Of the other of said branch wires $k^8$ the nine corresponding members thereof which coöperate with the particular wires $k^7$ of each of the groups $k^9$ unite into nine individual group-wires $k^{10}$, which extend to the individual members or front series of the punch-magnets $b^3$. It will thus be seen that the respective branch wires $k^7$ and $k^8$ from the character-keys $f^2$ are respectively grouped in a reverse order and that any of the nine row group-wires $k^9$ may coöperate with any of the nine individual group-wires $k^{10}$ in virtue of the relative arrangement of their component branches $k^7$ and $k^8$. By this factoring principle two sets of nine magnets each may be made to operate corresponding sets of punches to make two holes for each of $9 \times 9 = 81$ character-keys, and the two sets of eighty-one branches $k^7$ $k^8$ or one hundred and sixty-two wires may be reduced directly at the keyboard to the two sets of nine wires $k^9$ $k^{10}$, or eighteen in all, for communication with the may-be-distant magnets $b^3$. For a complete font of characters or type, however, eighty-one combinations are not necessary, and hence some of the groups in the electric connections just described are not full. They are filled out far enough to give working holes on the strip for representing the seventy-two characters provided on the particular type-writing machine employed, as shown on the keyboard in Fig. 8. Again, for positioning the matrix-block on the type-casting machine to select some matrices the block only need be intercepted by magnet-controlled stops in one direction, being permitted to go to its limit in the other, and hence for these only one hole need be made in the strip $r$, requiring only one of the branch wires $k^7$ $k^8$ from the corresponding character-key of the keyboard. As is obvious, since the key connections between the keys and the punch-operating magnets are grouped the said keys must in like manner be grouped. Of course the word "grouped," as here used, does not signify a separation or location of the keys, but rather a classification, according to the functions to be performed by the same.

The space-keys $f^3$ have contact-arms $k^{11}$, adapted to engage with insulated spring-contacts $k^{12}$, fixed to the type-writer frame $f'$ and connected by wire $k^{13}$ with the right-hand member of the front series or individual punch-magnets $b^3$, which is set apart to make the word-space holes on the strip. The space-keys $f^3$ will receive current from source-wire $k'$, contact $k^2$, bail $f^4$, and the frame of the type-writer.

From the source-wire $k'$ extends a branch wire $k^{14}$ to a contact $k^{15}$, arranged on or near the type-writer for coöperation with a specially-provided trip-key $K^{16}$, which connects by wire $k^{17}$ with the right-hand member of the rear series of the punch-magnets $b^3$ for producing a trip-hole in the strip. All the punch-magnets $b^3$ have a common return-wire $k^{18}$, which extends to the feed-magnets $c^7$, and whence wire $k^{19}$ leads back to source $k$.

In the diagram Fig. 10 the character-keys $f^2$ are laid out as if the members of each group were in regular order side by side; but of course it will be understood that it is only the branch wires $k^7$ $k^8$ which are grouped and that the keys $f^2$ occupy their ordinary positions on the keyboard. The key-levers are composed of wood.

Operation: Looking now to the action, the type-writing machine is operated in the usual manner. Whenever a character-key $f^2$ is struck, the proper members of the punch-magnet $b^3$ will be energized to cause the corresponding punches $b$ to make working holes in the strip $r$ representing the corresponding characters. Whenever a word-space is reached, one of the space-keys $f^3$, when operated, will close the circuit over the wire $k^{13}$ and through the proper member of the punch-magnets $b^3$ to operate the corresponding punch to make a word-space hole in the strip $r$. When the operator reaches the point where he sees by the indicator H that he must break the line of composition, he strikes the proper member of the character-keys on which is denoted the proper justification-number corresponding to the number of units of "extras" or "intras" which need to be distributed in order to justify the line. For example, if the predetermined line crosswise of the column of print be fixed at one hundred and thirty units and the line of composition selected be that represented on the strip, as shown in Fig. 7, the indicator-pointer will stand at one hundred and twenty units, showing ten units of space or extras, which must be distributed in order to justify the line, and in that event the operator will strike the character-key containing the justification-number 10. (Shown in Fig. 8 as on the character-key V.) Thereby the proper members of the punch-magnets $b^3$ will be energized to make the justification-holes $r'$ in the strip. These holes $r'$ would also represent the character V, but are made to serve for purposes of justification in virtue of a two-way switch on the type-casting and type-setting machine, which in one position establishes electrical connection for a so-called "working" circuit and in another position for a so-called "setting" circuit, by means of which the parts of a justifier may be properly set. The special key $K^{16}$ is operated last of all for the line of composition, and thereby the circuit is closed over wire $k^{17}$, &c., through the proper member of the magnets $b^3$ to operate the corresponding member of the punches $b$ and make in the strip $r$ the trip-hole $r^2$. This trip-hole $r^2$ is for the purpose, among other things, of controlling the two-way switch on the type-casting and type-setting machine, just above noted, in order to render the justification-holes $r'$ available to do their work. Every time that any of the circuit connections from the keyboard, hereinbefore noted, are closed through any of the punch-magnets $b^3$ the feed-magnet $c^7$ on the common return-wire $k^{18}$ will also be energized. Hence the thrust-bar $c$, under the coöperative alternate action of the magnet $c^7$ and the retracting-spring $c^2$, will be reciprocated to operate the needles $c^{15}$ $c^{16}$, as hitherto described, to make one of the marginal feed-holes $r^3$ and feed the strip forward one step. In this way every element of the composition for line after line of matter, including the justification-holes and the trip-holes for rendering the justification-holes available, may be represented on the strip $r$ in proper positions for controlling the type-casting and type-setting machine to produce justified lines of type. A specimen of this controlling-strip for a single line is shown full size in Fig. 7. When applied to the type-casting machine, this strip $r$ is fed in the reverse order of its making on the composing-machine. Hence the last-made or trip hole $r^2$ will come first and next the justification-holes $r'$ for coöperative action to set the justifier and deliver the line of type last previously cast, if any there be. On the specimen strip $r$ (shown in Fig. 7) two of the trip-holes $r^2$ are shown, one at the beginning and the other at the end of the line of composition, as would be required for a detached piece of strip with a single line of composition. In practice the strip $r$ is continuous, and every trip-hole $r^2$ has the double function above noted. While the strip $r$ is being punctured to represent the composition, as described, the type-writing mechanism will have also operated to produce on the paper $f^6$ a type-written proof of the same. The strip and the type-written proof go thence together to the type-casting and type-setting machine, and if there be any errors in the composition the printer will be enabled to at once correct the same in the justified lines of type by substitution in the ordinary way.

By actual usage I have found that the punch and feed magnets $b^3$ and $c^7$ when properly made will energize and deënergize as rapidly as the type-levers $f^7$ will respond to the keys $f^2$, and that I am able, therefore, with this composing-machine to obtain absolute type-writer's speed.

Of course it will be understood that modifications might be made in any of the details of my mechanism without departing from the spirit of my invention. For example, the little motors for unwinding and winding up the strip might be of any other suitable form.

It should be understood that the terms "groups of keys," "sets of punches," and "sets of magnets" as used in this specification and in certain of the claims are used to indicate the functional arrangements of these parts rather than their relative local positions, and hence that the relative locations of these parts may be altered or varied without departing from the principles of my invention.

What I claim, and desire to secure by Letters Patent of the United States, is as follows:

1. The combination with the source-wire $k'$ of the insulated spring-contact $k^2$, the bail $f^4$, frame $f'$, wire $k^3$, mercury-trough $k^4$, and the keys $f^2$ with contacts $k^5 k^6$, of such length and so related to the parts $k^2$ and $k^4$ that they will only enter or leave the mercury when the circuit is broken between $k^2 f^4$, substantially as and for the purposes set forth.

2. A positive-feed mechanism for a strip of material comprising a pair of coöperating parts which alternately penetrate the strip, the penetration of the one part taking place when the strip is held stationary by the other and at least one of said parts having a limited movement in the direction of the strip's travel, whereby, an exact feed is insured to the strip, substantially as described.

3. The combination with strip-supporting devices, of a reciprocating thrust-bar, movable transversely to the path of the strip, and a pair of feed-needles, or coöperating parts, carried by said thrust-bar, which alternately engage with the strip and are so related that the engagement of the one needle takes place when the strip is held stationary by the other, at least one of which needles has a limited movement in the direction of the strip's travel.

4. The combination with strip-supporting devices, of a thrust-bar reciprocating transversely to the strip, a pair of feed-needles on said thrust-bar between which the strip is passed, one of which is pivoted to the thrust-bar, a pair of cam-lugs for rocking the pivoted needle at the opposite limits of the thrust-bar's stroke and a spring-catch for yieldingly holding the needle at the opposite limits of its rocking motion, substantially as described.

5. The combination with strip-supporting devices, of a thrust-bar subject to the action of a magnet in one direction and a retracting-spring in the other, circuit connections for energizing said magnet at the proper time to reciprocate said bar, and a pair of feed-needles, carried by said bar, alternately engageable with the strip from opposite side, of the same, at least one of which needles has a limited movement in the direction of the strip's travel, substantially as described.

6. The combination with the strip guide-block, of the thrust-bar $c$, the fixed needle $c^{15}$ carried by the part of said thrust-bar above said guide, the pivoted feed-needle $c^{16}$ carried by the part of said thrust-bar below said guide and having its free end working in and limited by a slot $c^{18}$ in said guide-block, substantially as and for the purpose set forth.

7. The combination with the strip guide-block having the slot $c^{18}$, of the thrust-bar $c$, the feed-needle $c^{16}$, having the arms $c^{19} c^{20}$, carried by the thrust-bar with its free end working in said slot $c^{18}$, the fixed cam-lugs $c^{21}$ coöperating with the arm $c^{19}$ and the spring-latch $c^{23}$ on the thrust-bar, coöperating with the arm $c^{20}$, substantially as described.

8. The combination with the strip-supporting devices of the feed-needles alternately engageable with the strip and one of which has a limited movement in the direction of the strip's travel to feed the strip, and a dash-pot applied to retard the action of said feeding member of said needles, to avoid tearing the strip, substantially as described.

9. The combination with the strip-supporting devices, of the thrust-bar $c$ subject to magnet $c^7$ and retracting-spring $c^2$, the fixed feed-needle $c^{15}$ and the pivoted feed-needle $c^{16}$ carried by the thrust-bar and operating on said strip as described, and the dash-pot applied to said thrust-bar to retard the action of the thrust-bar and pivoted feed-needle when feeding the strip, substantially as described.

10. The combination with the feed-needles $c^{15} c^{16}$ and the thrust-bar $c$, carrying the same, of the retarding device, applied to said thrust-bar, comprising the lever $c^8$, dash-pot proper $c^{10}$, spring $c^{13}$ and rod $c^{14}$, arranged and operating substantially as described.

11. The combination with strip-feeding devices, of a strip supplying or receiving device, electric connections for controlling the operation of said supplying or receiving device, and means whereby said connections are automatically controllable by the strip itself to always maintain a limited slack section of the strip, upon which the feeding devices may act, to propel the same, without any strain beyond the weight of the slack section of the strip, substantially as described.

12. The combination with strip-feeding devices, of a strip supplying or receiving device, an electric motor for operating said supplying or receiving device, and electric connections for said motor controllable by the strip itself, to always maintain a limited slack section in the strip upon which slack section the feed devices may act without any strain beyond the weight of said slack section, substantially as described.

13. The combination with strip-feeding devices, of strip-supplying and strip-receiving devices, on opposite sides of said feeding devices, a corresponding pair of electric motors for operating said supply and receiving devices, and circuit connections for the same controlled by the strip itself to supply and take up the strip as required to always maintain a slack section of the strip subject to the feeding devices, substantially as described.

14. The combination with the strip-feeding devices, of the pair of strip-holding spools, on opposite sides of the feeding devices, for unwinding and winding up the strip, the pair of electric motors for said spools, and circuit connections for both of said motors controlled by the strip itself to unwind and wind up the strip as required to maintain a slack section subject to the feeding devices, substantially as described.

15. The combination with the spool $d'$, of the electric motor $d^4$ and circuit connections for the same including as one of its elements the pivoted contact $d^{10}$ tending to close the circuit at $d^{11}$, but operating to open the circuit whenever, from excess of slack, the strip drops onto the same, substantially as described.

16. The combination with the spool $d^2$, of the electric motor $d^5$ and circuit connections for the same including as one element thereof the pivoted contact $d^{15}$ tending to open the circuit at $d^{16}$ but operating to close the circuit whenever, from excess of slack, the strip drops onto the same, substantially as described.

In testimony whereof I affix my signature in presence of two witnesses.

GEORGE A. GOODSON.

Witnesses:
    JAS. F. WILLIAMSON,
    E. F. ELMORE.